United States Patent

Diehl et al.

[11] Patent Number: 5,835,864
[45] Date of Patent: Nov. 10, 1998

[54] METHOD AND APPARATUS FOR CUSTOMIZING A DEVICE WITH A SMART CARD

[75] Inventors: Eric Diehl, Strasbourg; Joel Hamon, Lipsheim, both of France

[73] Assignee: Thomson Consumer Electronics S.A., Courbevoie, France

[21] Appl. No.: 604,350

[22] Filed: Feb. 21, 1996

Related U.S. Application Data

[63] Continuation of Ser. No. 190,118, filed as PCT/EP92/02195 Sep. 23, 1992 published as WO93/07715 Apr. 15, 1993, abandoned.

[30] Foreign Application Priority Data

Oct. 3, 1991 [EP] European Pat. Off. .............. 91402645
Sep. 23, 1992 [EP] European Pat. Off. .............. 92102195

[51] Int. Cl.[6] ...................................... H04N 7/16
[52] U.S. Cl. .............................. 455/602; 455/6.1; 348/10; 348/6
[58] Field of Search ................ 348/6, 7, 10, 12, 348/734, 731; 455/6.2, 6.1; 380/23, 29

[56] References Cited

U.S. PATENT DOCUMENTS

| 5,105,268 | 4/1992 | Yamanouchi et al. .................. 348/10 |
| 5,235,328 | 8/1993 | Kurita .................................... 348/734 |
| 5,282,244 | 1/1994 | Cohen et al. ............................ 380/23 |

FOREIGN PATENT DOCUMENTS

| 0328440 | 8/1989 | European Pat. Off. ......... H04H 1/00 |
| 428 252 A2 | 5/1991 | European Pat. Off. ....... H04N 7/167 |
| 0436472 | 10/1991 | European Pat. Off. ......... H04N 7/16 |
| WO88/02899 | 4/1988 | France ........................ H04N 7/167 |
| 61-114680 | 6/1986 | Japan .......................... H04N 7/167 |
| 63-240190 | 10/1988 | Japan ........................... H04N 7/16 |
| WO91.12693 | 8/1991 | WIPO ........................ H04N 7/167 |

OTHER PUBLICATIONS

ISO/IEC 7816–3, Pt. 3: Electronic Signals and Transmission Protocols.
European Scrambling Systems/John McCormac, Waterford U.Press.
Elektronik, vol. 38, No. 6 Mar. 17, 1989 M.Junke, Digital Television Concept for Satellite Pay TV.
Conference and Exhibition on Television Techniques vol. 2, Jun., 1990, "Second Generation of Conditional Access Systems for Television" J. Blineau.
13th International TV Symposium, "The Memory Card its Possible Use to Pay TV Satellite Broadcasting" Q.A. Hoang.

*Primary Examiner*—Nathan T. Flynn
*Attorney, Agent, or Firm*—Joseph S. Tripoli; Peter M. Emanuel; David T. Shoneman

[57] ABSTRACT

A device such as a pay TV decoder, a television receiver, a VCR or a remote control is automatically customized with information such as channel, frequency, and/or remote control codes that is stored in memory in a smart card. The smart card transmits the information to the device via a smart card reader. The information is transmitted to the device in response to the smart card being coupled to the smart card reader. Customization by smart card facilitates efficient production of devices such as pay TV decoders because all devices can be identical during manufacturing and customized easily after manufacturing. For example, a cable TV operator can customize each pay TV decoder with channel allocation information appropriate for the site of the decoder by using a smart card.

10 Claims, 4 Drawing Sheets

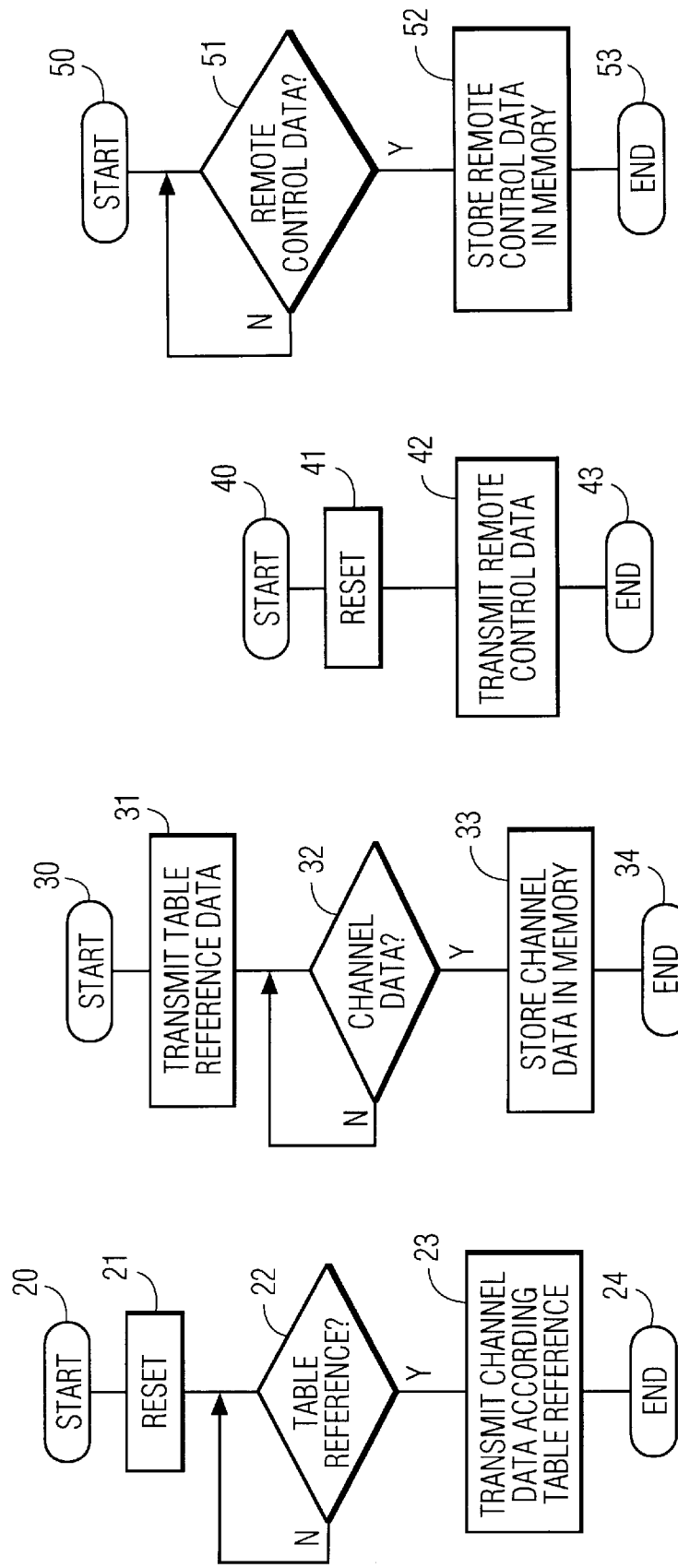

METHOD AND APPARATUS FOR CUSTOMIZING A DEVICE WITH A SMART CARD

This is a continuation of application Ser. No. 08/190,118, filed as PCT/EP92/02195 Sep. 23, 1992, published as WO93/07715 Apr. 15, 1993 now abandoned.

The present invention relates to a method and to an apparatus for customizing a device with a smart card.

BACKGROUND

New pay TV systems, e.g. the Videocrypt system, make use of smart cards which control the access to a respective decoder for de-scrambling the TV signal.

INVENTION

It is one object of the invention to disclose a method of customization a pay TV decoder. This object is reached by the inventive method disclosed in claim 1.

In principle the inventive method consists in customizing a device 6 with a smart card 5, whereby a dedicated smart card is linked to a card reader 4 of said device, and whereby said device is also provided with memory means 1, 3 and with processor unit means 2 connected to said memory means and to said card reader, and whereby said dedicated smart card 5 is provided with the following functions:

presentation of a normalized answer to a 'reset' command;

presentation of an application identifier to said device 6;

procedure which transmits to said device 6 data contained in a table, said table containing different values for customization of said device 6, and said device 6 becomes customized automatically after said dedicated smart card 5 has been inserted to said card reader 4 by transmitting data from said smart card 5 to said device 6 an d storing respective data in said memory means 1.

Advantageous additional embodiments of the inventive method are resulting from the respective dependent claims.

It is a further object of the invention to disclose an apparatus which utilizes the inventive method.

In principle the inventive apparatus contains processor unit means 2 which are connected to memory means 1, 3 and to a card reader 4 in which a smart card 5 is inserted, whereby data stored in said smart card 5 are transmitted to said card reader 4 and respective data become stored in said memory means 1.

In order to be efficient in production, decoders have to be completely identical for the manufacturer. But each program provider would prefer specifically customized decoders. For instance, in cable networks the cable operators will use different channel allocation depending from the respective site. Currently the only solution available is that the user or more often the installer will programme the decoder. This operation is fastidious and consumes a lot of time. The inventive method offers a quick and flexible solution for personalizing intelligently a pay TV decoder or respective devices. In each pay TV receiver decoder with an access control based on a smart card there are the following components:

a non-volatile memory, typically of EEPROM type, which memorizes several parameters, especially the channels' frequencies;

a central processor unit (CPU);

a ROM memory containing the application software;

a card reader which allows the CPU to read from a smart card.

Such a system is able to read any smart card responding to a predefined format. The invention uses a dedicated smart card in order to perform automatically a channel programming.

DRAWING

Preferred embodiments of the invention will now be described with reference to the accompanying drawing:

FIG. 7 shows, in flowchart form, a software routine executed by a microprocessor in a first smart card.

FIG. 8 shows, in flowchart form, a first software routine executed by a microprocessor in a Pay-TV decoder.

FIG. 9 shows, in flowchart form, a software routine executed by a microprocessor in a second smart card.

FIG. 10 shows, in flowchart form, a second software routine executed by a microprocessor in a Pay-TV decoder.

PREFERRED EMBODIMENTS

Figure 1:
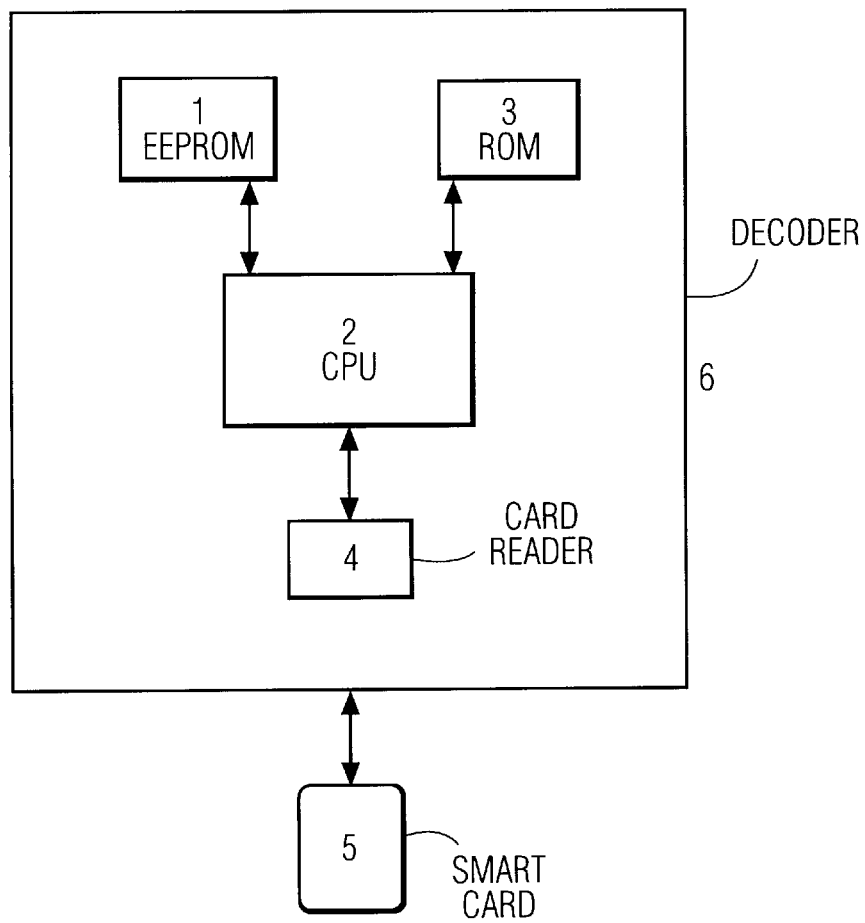
FIG. 1 shows a partial block diagram of an inventive pay TV decoder together with a smart card.
Figure 4:
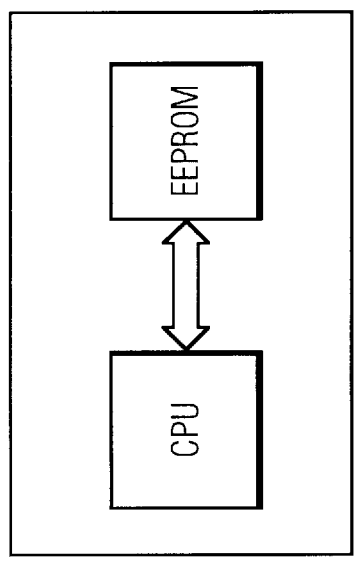
FIG. 4 shows a partial block diagram of a smart card.

The smart card 5 in FIG. 1 contains (see FIG. 4) a CPU, an interface and a memory with software which performs at least the following functions:

presentation of a normalized answer to 'reset' (steps 21 and 41 in FIGS. 7 and 9, respectively; see also International Standards Organization (ISO) Standard 7816-3 entitled "Identification Cards—Integrated circuit(s) cards with contacts—Part 3: Electronic signals and transmission protocols";

presentation of an application identifier to decoder 6;

procedure which transmits to decoder 6 the data contained in a table, for instance by using a dedicated instruction class (see ISO 7816-3 section 8.2.1);

table containing the different values for customization.

Pay TV decoder 6 contains a CPU 2, which is connected to a ROM 3, to an EEPROM memory 1 and to a card reader 4. Once the decoder 6 has identified the installer smart card, it will store the data received from smart card 5 inside memory 1. After this operation the receiver part of decoder 6 (not depicted) will be correctly programmed. This operation can be completely automatic and transparent or may be initiated by the installer, e.g., in a menu-controlled way.

Smart card 1 can be dedicated to one configuration. But if a card with larger memory is used it is possible to use the same smart card 1 for different configurations from the same program provider by changing a little bit the software stored in the smart card and in the decoder's program memory. If a procedure is added which allows to send to smart card 5 a reference (step 31 in FIG. 8), the card will be able to point to the corresponding table and down load the right one (steps 22 and 23 in FIG. 7 and steps 32 and 33 in FIG. 8).

Figure 5:
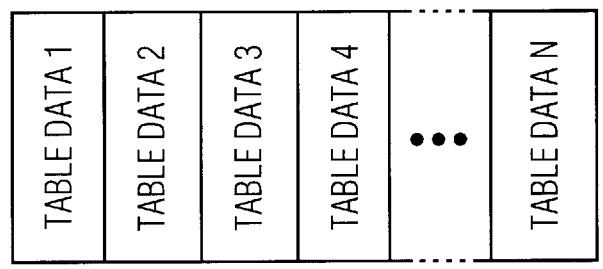
FIG. 5 depicts contents of a memory of a first smart card.

In case of cable networks it is possible to store in one card all the channel allocation tables (see FIG. 5) for the different sites belonging to the program provider. Thereby the intervention of the installer is reduced and the programming of the channels is efficient. If smart cards 5 with EEPROM memory (see e.g., FIG.4) are used, it advantageously is possible to change at any moment the configuration of the network without changing the smart cards. Another advantage is that decoder 6 does not need to know which form the allocation table will have. The cable operator may change very easily its parameters (like raster) between adjacent channels. Obviously the installation time is reduced drastically.

Sometimes decoder 6 must be customized according to a customer configuration. If a video cassette recorder (VCR) is controlled from a pay TV decoder via an infra-red link, decoder 6 must store infra-red codes for this connection to the VCR. This codes, too, can be down loaded by a dedicated smart card 5. The installer may have a listing of all VCR types and a bunch of smart cards. If he has found the correct type, he inserts the right card and requests the right table to be downloaded.

Figure 2:
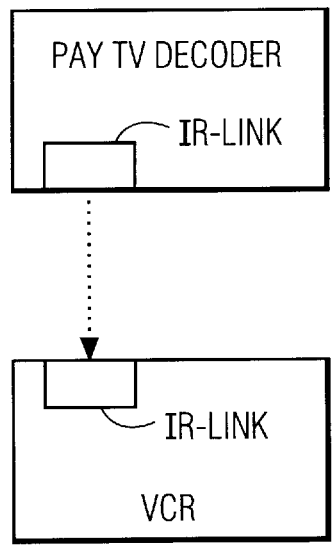
FIG. 2 shows, in block diagram form, an infra-red link between a Pay-TV decoder and a TV receiver.

This invention can also be used for customizing universal infra-red hand sets or other devices like TV's, VCR's or audio equipment. The remote control hand set can be programmed via an infra-red link (see FIG. 2) between the pay TV decoder and itself (step 42 in FIG. 9 and steps 51 and 52 in FIG. 10).

Figure 6:
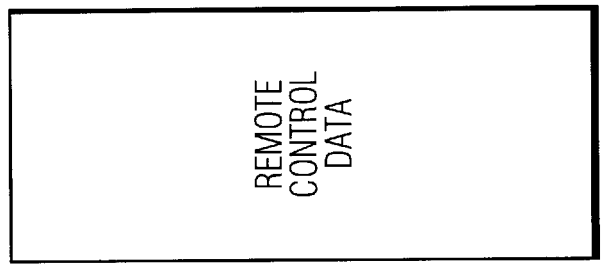
FIG. 6 depicts contents of a memory of a second smart card.

The hand set or device, respectively, itself also may include a smart card reader and be programmed in a direct way. Therefore it is possible that different manufacturers use the same hand set which will be programmed with remote control codes stored in memory see (see FIG. 6) of a specific smart card added from the respective manufacturer to the hand set.

The hand set may also be programmed by any other device, e.g. TV receiver, audio amplifier, which contains a respective card reader.

Figure 3:
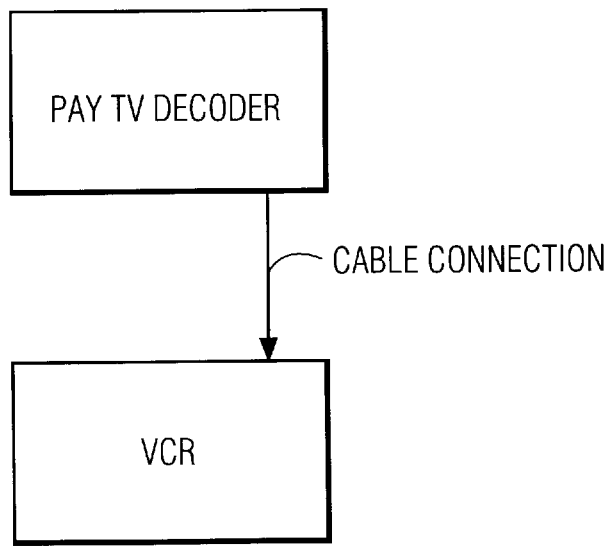
FIG. 3 shows, in block diagram form, a cable connection between a Pay-TV decoder and a TV receiver.

Instead of an infra-red link also other communication paths are possible, for instance temporary cable connections (See FIG. 3).

We claim:

1. Method for automatic programming of frequencies or channel numbers of a pay TV decoder, comprising the following steps:

coupling a smart card containing a frequency or channel number data table to a card reader coupled to said pay TV decoder;

resetting said smart card;

sending a table reference to said smart card;

transmitting, according to the frequencies or channels to which access is allowed, data concerning said locally available frequencies or channel numbers from said smart card to said card reader; and storing the frequency or channel number data in memory means of said decoder using processor unit means coupled to said memory means and to said card reader for customizing said decoder.

2. Method of claim 1, including the further step of transmitting said data concerning said frequencies or channel numbers via an infra-red link from said pay TV decoder to a VCR or receiver for programming said VCR or receiver automatically; said infra-red link utilizing IR code data stored in said smart card.

3. Method of claim 1, including the further step of transmitting said data concerning said frequencies or channel numbers via a cable connection from said pay TV decoder to a VCR or receiver for programming said VCR or receiver automatically.

4. Method for automatic programming of a remote control with remote control code, comprising the following steps:

coupling a smart card containing remote control code data to a card reader coupled to a pay TV decoder;

resetting said smart card;

transmitting remote control data from said smart card to said card reader;

transmitting via an infra-red link from said pay TV decoder to said remote control said remote control data for programming said remote control automatically.

5. Method of claims 1 or 4 wherein the programming is performed in a menu-controlled way after said smart card is coupled to said card reader.

6. Apparatus for programming frequencies or channel numbers of a pay TV decoder, comprising:

a first memory for storing data;

a processor unit coupled to said memory;

a smart card reader coupled to said processor unit;

a smart card including a second memory for storing a table of frequency or channel number data;

said smart card responding automatically to said smart card being coupled to said smart card reader for transmitting data concerning frequencies or channel numbers to which access is locally available from said table stored in said second memory to said card reader; and said frequency or channel number data being stored in said first memory for customizing said pay TV decoder.

7. Apparatus according to claim 6, wherein:

said second memory in said smart card storing a plurality of tables of said frequency or channel number data; each of said tables representing a different channel configuration for said pay TV decoder;

said processor unit sending a table reference to said smart card; and said smart card responding to said table reference for transmitting from said smart card to said card reader data from one of said plurality of tables;

said data from said one of said plurality of tables being stored in said first memory for adapting said pay TV decoder to channels locally available in a cable network.

8. Apparatus according to one of claim 6 or claim 7, wherein:

said pay TV decoder being coupled to a television receiver via an infra-red link utilizing infra-red codes for transmitting said frequency or channel number data to said television receiver;

said second memory storing data representative of said infra-red codes.

9. Apparatus according to one of claim 6 or claim 7, wherein said pay TV decoder being coupled to a television receiver via a cable connection for transmitting said frequency or channel number data to said television receiver.

10. Apparatus according to claim 6 or claim 7, wherein:

said second memory storing data representing remote control codes;

said data representing remote control codes being transmitted to said smart card reader; and said data representing remote control codes being transmitted via an infra-red link from said pay TV decoder to a remote control for automatically programming said remote control.

* * * * *